United States Patent
Le et al.

(10) Patent No.: US 7,151,673 B2
(45) Date of Patent: Dec. 19, 2006

(54) MEMORY CARD HOST CONNECTOR WITH RETRACTABLE SHIELDLESS TAB

(75) Inventors: Trung V. Le, White Bear Township, MN (US); Steven L. Lindblom, Inver Grove Heights, MN (US); Robert W. Tapani, Oakdale, MN (US)

(73) Assignee: Imation corp., Oakdale, MN (US)

( * ) Notice: Subject to any disclaimer, the term of this patent is extended or adjusted under 35 U.S.C. 154(b) by 316 days.

(21) Appl. No.: 10/788,594

(22) Filed: Feb. 27, 2004

(65) Prior Publication Data

US 2005/0204086 A1    Sep. 15, 2005

(51) Int. Cl.
*H05K 1/14* (2006.01)
(52) U.S. Cl. ............... 361/737; 361/785; 361/727; 439/79; 439/676
(58) Field of Classification Search ............... 361/737, 361/785, 727, 715; 710/301; 711/103; 701/301; 439/79, 676
See application file for complete search history.

(56) References Cited

U.S. PATENT DOCUMENTS

| | | | |
|---|---|---|---|
| 6,005,774 A * | 12/1999 | Chiba et al. ............... 361/737 |
| 6,148,354 A | 11/2000 | Ban et al. |
| 6,381,143 B1 | 4/2002 | Nakamura |
| 6,385,677 B1 | 5/2002 | Yao |
| 6,407,940 B1 | 6/2002 | Aizawa |
| 6,490,667 B1 | 12/2002 | Ikeda |
| 6,501,163 B1 | 12/2002 | Utsumi |
| 6,542,358 B1 * | 4/2003 | Kunz et al. ............... 361/686 |
| 6,567,273 B1 | 5/2003 | Liu et al. |
| 6,616,053 B1 | 9/2003 | Kondo et al. |
| 6,618,789 B1 | 9/2003 | Okaue et al. |
| 6,654,841 B1 | 11/2003 | Lin |
| 6,676,420 B1 | 1/2004 | Liu et al. |
| 6,744,634 B1 * | 6/2004 | Yen ............... 361/752 |
| 6,808,400 B1 * | 10/2004 | Tu ............... 439/131 |
| 6,854,984 B1 * | 2/2005 | Lee et al. ............... 439/79 |
| 2002/0147882 A1 | 10/2002 | Pua et al. |
| 2002/0195500 A1 | 12/2002 | Maruyama |
| 2003/0095386 A1 | 5/2003 | Le et al. |
| 2004/0033727 A1 | 2/2004 | Kao |

FOREIGN PATENT DOCUMENTS

CN    1304115    7/2001

(Continued)

OTHER PUBLICATIONS

Co-Pending U.S. Appl. No. 10/644,484, filed Aug. 20, 2003, Trung V. Le, entitled "Memory Card Compatible with Multiple Connector Standards".

(Continued)

*Primary Examiner*—Kamand Cuneo
*Assistant Examiner*—Hung S. Bui
(74) *Attorney, Agent, or Firm*—Eric D. Levinson

(57) ABSTRACT

The invention is directed to a memory card that includes a device connector conforming to the memory card standard, and a host connector conforming to a host connection standard and comprising a retractable shieldless tab compatible with the host connection standard. The presence of the two connectors adds versatility to the memory card. The host connector facilitates direct coupling of the memory card to a computing device without an adapter or reader. The memory card maintains a form factor of the memory card standard when the shieldless tab is retracted, which allows the memory card to be used similar to a conventional memory card of the memory card standard. In order to fit within the memory card standard form factor, the shieldless tab may be an altered version of a conventional connector interface conforming to the host connection standard.

20 Claims, 6 Drawing Sheets

FOREIGN PATENT DOCUMENTS

| EP | 1 132 824 A2 | 9/2001 |
| EP | 1 197 826 A1 | 4/2002 |
| EP | 1 333 531 A1 | 8/2003 |

OTHER PUBLICATIONS

Co-Pending U.S. Appl. No. 10/788,591, filed Feb. 27, 2004, Trung V. Le., entitled "Multi-Connector Memory Card with Retractable Sheath to Protect the Connectors".

Co-Pending U.S. Appl. No. 10/788,600, filed Feb. 27, 2004, Trung V. Le et al., entitled "Credit Card Sized Memory Card with Host Connector".

Co-Pending U.S. Appl. No. 10/788,623, filed Feb. 27, 2004, Trung V. Le, entitled "Memory Card Compatible with Device Connector and Host Connector Standards".

* cited by examiner

MEMORY CARD HOST CONNECTOR WITH RETRACTABLE SHIELDLESS TAB

TECHNICAL FIELD

The invention relates to removable storage media devices and, in particular, removable memory cards with host connectors.

BACKGROUND

A wide variety of removable storage media exists for use with voice recorders, digital video camcorders, digital cameras, personal digital assistants (PDAs), cellular phones, video games, digital televisions, photo printers, and the like. The removable storage media allows users to capture and store data on such devices, and easily transport the data between these various devices and a computer.

One of the most popular types of removable storage media is the flash memory card, which is compact, easy to use, and has no moving parts. A flash memory card includes an internal, high-speed solid-state memory capable of persistently storing data without application of power. Numerous other memory standards can also be used in memory cards, including electrically-erasable-programmable-read-only-memory (EEPROM), non-volatile random-access-memory (NVRAM), and other non-volatile or volatile memory types, such as synchronous dynamic random-access-memory (SDRAM), with battery backup.

A wide variety of memory cards have been recently introduced, each having different capacities, access speeds, formats, interfaces, and connectors. Examples of memory cards include CompactFlash™ (CF) first introduced by SanDisk™ Corporation, the Memory Stick™ (MS) and subsequent versions including Memory Stick Pro and Memory Stick Duo developed by Sony Corporation, Smart Media™ memory cards, Secure Digital (SD) memory cards, and MultiMedia Cards (MMCs) jointly developed by SanDisk Corporation and Siemens AG/Infineon Technologies AG, and xD™ digital memory cards developed by Fuji.

Each of the different memory cards typically conforms to a specific form factor of the standard and includes a unique connector which conforms the electrical and mechanical interfaces of the card to the respective standard. Moreover, each different memory card generally requires a specialized adapter or reader for use with a computing device. The adapter or reader includes a specialized interface that conforms to that of the memory card, and a host interface that can be accepted by a computer. For example, an adaptor or reader may include an interface to receive a memory card and an interface to connect to a host computer, such as a personal computer memory card international association (PCMCIA) interface including a 16 bit standard PC Card interface and a 32 bit standard CardBus interface, a Universal Serial Bus (USB) interface, a Universal Serial Bus 2 (USB2) interface, a future generation USB standard, an IEEE 1394 FireWire interface, a Small Computer System Interface (SCSI) interface, an Advance Technology Attachment (ATA) interface, a serial ATA interface, an Integrated Device Electronic (IDE) standard, an Enhanced Integrated Device Electronic (EIDE) standard, a Peripheral Component Interconnect (PCI) interface, a PCI Express interface, a conventional serial or parallel interface, or the like.

Conventional memory cards have only one connector to interface with a device. The same connector also interfaces with the adaptor or reader to allow the memory card to be read by a host computer. Most conventional adapters and readers support only a single type of memory card, causing a user to carry and interchange adapters or readers when using different types of memory cards.

SUMMARY

In general, the invention is directed to a memory card that includes a device connector conforming to a memory card standard, and a host connector conforming to a host connection standard. The host connector comprises a retractable shieldless tab compatible with the host connection standard. The presence of the two connectors adds versatility to the memory card. The device connector facilitates direct coupling of the memory card to a portable device such as a voice recorder, a digital video camcorder, a digital camera, a personal digital assistant (PDA), a cellular phone, a video game, a digital television, a photo printer, or the like. The host connector facilitates direct coupling of the memory card to a computing device without need for an adapter or reader. Additionally, the memory card maintains a form factor of the memory card standard when the shieldless tab is retracted, which allows the memory card to be inserted into portable devices the same way a conventional memory card would be used.

In order to conform the memory card form factor to that of a given standard, the shieldless tab may be an altered version of a conventional host connector interface. For example, the host connector may conform to a Universal Serial Bus (USB) standard or a Universal Serial Bus 2 (USB2) standard, and the shieldless tab may comprise a USB compatible tab without an electrical shield. The elimination of the shield substantially reduces the thickness of the host connector on the memory card and ensures that the host connector does not define a thickness larger than the memory card.

In one embodiment, the invention is directed to a memory card comprising a memory card housing, a host connector housing formed in the memory card housing, a memory in the memory card housing, a device connector, and a host connector. The device connector is accessible through the memory card housing, conforms to the memory card standard, and allows access to the memory by a device compatible with the memory card standard. The host connector comprises a shieldless tab extendable from the host connector housing. The host connector conforms to a host connection standard and allows access to the memory upon insertion of the shieldless tab extended from the host connector housing into a host computer interface compatible with the host connection standard.

In another embodiment, the invention is directed to a memory card comprising a memory card housing, a host connector housing formed in the memory card housing, a memory in the memory card housing, a device connector, and a host connector. The memory card housing has dimensions which substantially conform to a form factor of a memory card standard including a height of approximately 36 mm and a width of approximately 42 mm. The device connector is accessible through the memory card housing, conforms to the memory card standard, and allows access to the memory by a device compatible with the memory card standard. The host connector comprises a shieldless tab extendable from the host connector housing. The host connector conforms to a host connection standard and allows access to the memory upon insertion of the shieldless tab extended from the host connector housing into a host computer interface compatible with the host connection standard.

The thickness of the shieldless tab is less than the thickness of the memory card, which may also conform to the thickness defined by the memory card standard. For example, the thickness of the shieldless tab may be approximately 2.0 mm while the thickness of the card is between approximately 3.3 mm and 5 mm. A thickness of the shieldless tab including an electrical shield may be approximately 4.5 mm, which may be larger than a thickness of the memory card standard form factor. For this reason, elimination of the shield is needed in order to create a memory card that includes the host connector which does not add thickness to the card which would otherwise undermine insertion of the card into a device.

In another embodiment, the invention is directed to a memory card comprising a memory card housing, a host connector housing formed in the memory card housing, a memory in the memory card housing, a device connector, a host connector, electrical contacts disposed within the host connector housing, and a locking slot formed in the host connector housing. The device connector is accessible through a first side of the memory card housing, conforms to the memory card standard, and allows access to the memory by a device compatible with the memory card standard. The host connector is disposed on a second side of the memory card housing adjacent the first side and comprises a shieldless tab extendable from the host connector housing, electrical contacts disposed on the shieldless tab, and a locking element. The host connector conforms to a host connection standard and allows access to the memory upon insertion of the shieldless tab extended from the host connector housing into a host computer interface compatible with the host connection standard.

The electrical contacts disposed within the host connector housing are coupled to the electrical contacts disposed on the shieldless tab regardless of whether the shieldless tab is extended from the host connector housing or retracted into the host connector housing. Moreover, the electrical contacts disposed within the host connector housing may be spring loaded to provide a constant mechanical bias between the electrical contacts disposed within the host connector housing and the electrical contacts on the shieldless tab. In that case, the electrical contacts in the host connector housing bias the locking element of the host connector against the memory card housing such that the locking element engages with the locking slot when the shieldless tab is extended from the host connector housing. Another locking slot may lock the shieldless tab in a retracted position. A user may depress the host connector against the mechanical bias of the electrical contacts within the host connector housing in order to release the locking element from either locking slot.

The invention is capable of providing many advantages. For example, the host connector provides direct access to the memory card from a computing device without the need for an adapter or reader conforming to the memory card standard. Additionally, the shieldless tab is sized such that it may be retracted into the memory card without altering the form factor of the memory card. Therefore, the memory card is compatible with devices that are compatible with conventional memory cards of the memory card standard.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
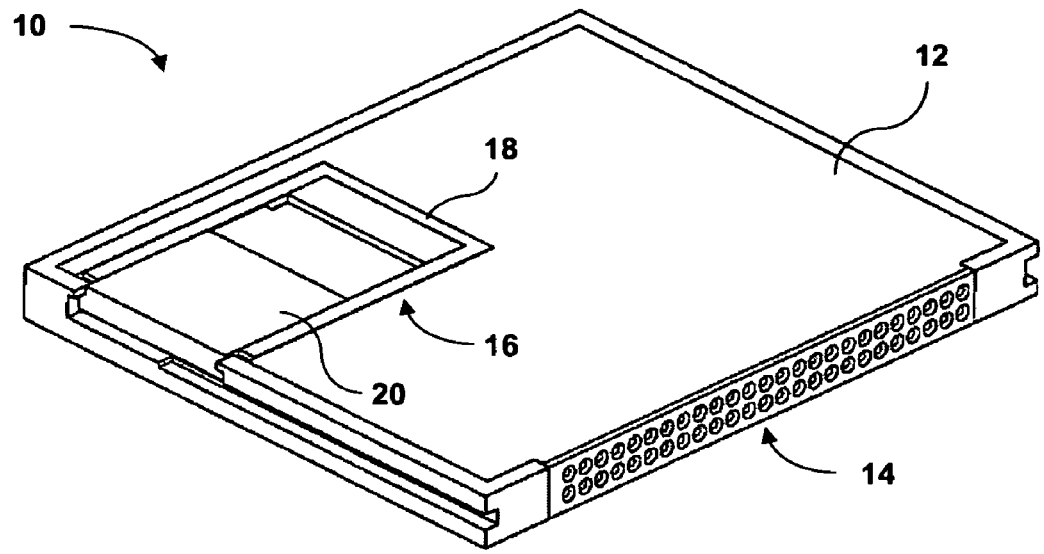
FIGS. 1 and 2 are schematic diagrams illustrating a memory card according to an embodiment of the invention.
Figure 2:
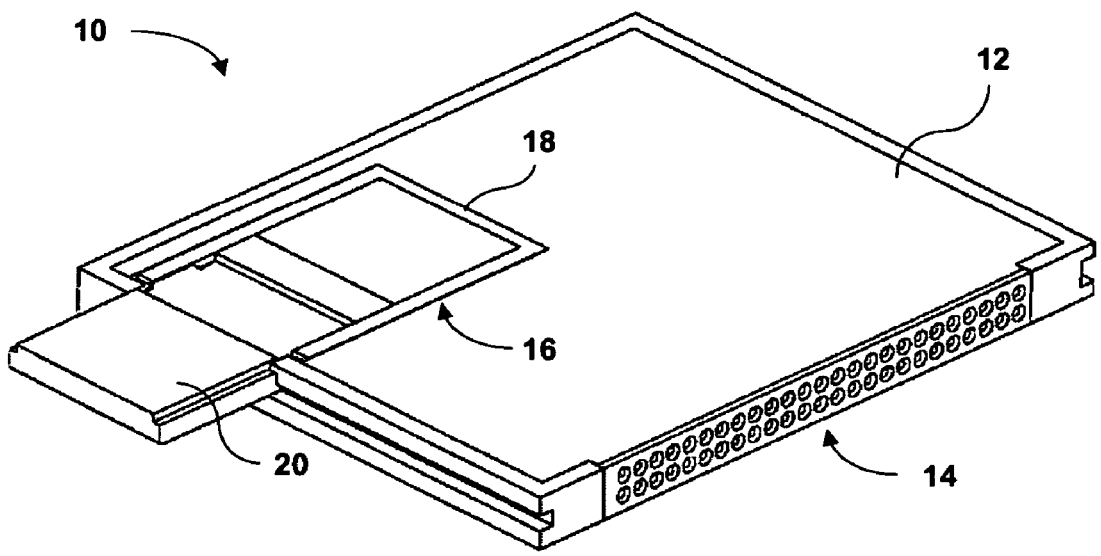

FIGS. 1 and 2 are schematic diagrams illustrating a memory card 10 according to an embodiment of the invention. Memory card 10 includes a memory card housing 12, a host connector housing 18 formed in memory card housing 12, a device connector 14, and a host connector 16. Device connector 14 conforms to a memory card standard of memory card 10 and facilitates access to an internal memory of memory card 10 by a device compatible with the memory card standard. Host connector 16 conforms to a host connection standard and comprises a shieldless tab 20 compatible with the host connection standard and extendable from host connector housing 18. Host connector 16 facilitates direct coupling of memory card 10 to a host computer via insertion of shieldless tab 20 extended from host connector housing 18 into a host computer interface. Shieldless tab 20 can also retract into host connector housing 18 such that memory card housing 12 substantially conforms to a form factor of the memory card standard. This allows memory card 10 to remain compatible with memory card slots in conventional portable devices that interface with device connector 14. FIG. 1 shows shieldless tab 20 retracted into host connector housing 18, while FIG. 2 shows shieldless tab 20 extended from host connector housing 18.

In the embodiment shown in FIGS. 1 and 2, device connector 14 conforms to a CompactFlash standard and host connector 16 conforms to either a USB standard, a USB2 standard, or a future generation USB standard. In that case, shieldless tab 20 comprises a USB compatible tab without an electrical shield. A form factor of the CompactFlash standard includes a height of approximately 36 mm, a width of approximately 42 mm, and a thickness between approximately 3.3 mm and 5 mm. A conventional USB plug includes a tab surrounded by an electrical shield and is coupled to a cable. The USB compatible tab may have a thickness of approximately 2.0 mm while the conventional USB plug including the electrical shield may have a thickness of approximately 4.5 mm, which may be larger than the memory card standard form factor. In the case of the conventional USB plug, the electrical shield is necessary to reduce or eliminate electrostatic effects that may corrupt the signal carried by the attached cable.

The invention described herein does not require the use of a cable to transmit data signals, because shieldless tab 20 may be directly coupled to both an internal memory of memory card 10 and a host computer interface. Therefore an electrical shield around shieldless tab 20 can be eliminated. Furthermore the elimination of the electrical shield enables shieldless tab 20 to fit within memory card housing 12 conforming to a form factor of a memory card standard of memory card 10.

In other embodiments, device connector 14 may conform to a Smart Media standard, a MultiMedia Card standard, a Secure Digital standard, a Memory Stick standard and subsequent versions including Memory Stick Pro and Memory Stick Duo, an xD standard, a yet released standard, or the like. Host connector 16 may conform to a variety of standards as long as a compatible shieldless tab can be formed to fit within memory card housing 12. Examples of host connection standards include a personal computer memory card international association (PCMCIA) standard including a 16 bit standard PC Card interface and a 32 bit standard CardBus interface, a USB standard, a USB2 standard, a future generation USB standard, an IEEE 1394 FireWire standard, a Small Computer System Interface (SCSI) standard, an Advance Technology Attachment (ATA) standard, a serial ATA standard, an Integrated Device Electronic (IDE) standard, an Enhanced Integrated Device Electronic (EIDE) standard, a Peripheral Component Interconnect (PCI) standard, a PCI Express standard, a conventional serial or parallel interface standard, or the like. The standards described herein refer to such standards as defined on the filing date of this patent application.

In an exemplary embodiment, device connector 14 and host connector 16 may be disposed on adjacent sides of memory card housing 12, as shown in FIGS. 1 and 2. This arrangement reduces the possibility of device connector contacts being touched or handled by a user when shieldless tab 20 is inserted into a host connector interface of a host computing device. For example, excessive handing of the device connector contacts may damage the memory card by subjecting the components within memory card housing 12 to electrostatic effects, dust, and debris. Of course, device connector 14 and host connector 16 could be disposed on opposing sides in other embodiments.

Device connector 14 and host connector 16 are electrically coupled to a memory disposed within memory card housing 12 via electrical contacts (not shown). For example, first electrical contacts may be disposed on shieldless tab 20 and second electrical contacts may be disposed within host connector housing 18, as described in more detail below. In one embodiment, the electric contacts of shieldless tab 20 and host connector housing 18 are continually coupled to each other regardless of the position of shieldless tab 20. In another embodiment, the electrical contacts are coupled to each other only when shieldless tab 20 is extended from host connector housing 18.

A mechanical bias may be applied to host connector 16 such that a user must depress host connector 16 against the mechanical bias in order to slide host connector 16 within the host connector housing to extend shieldless tab 20 from host connector housing 18 or retract shieldless tab 20 into host connector housing 18. Host connector 16 may also include a locking system to lock shieldless tab 20 in an extended position and/or a retracted position. The mechanical bias and the locking system may be used together such that a user must depress host connector 16 to disengage the locking system. By locking shieldless tab 20 into the extended position, shieldless tab 20 can be ensured to meet the force required for insertion into a host computer interface. The locking system may also restrain host connector 16 from completely disengaging from host connector housing 18. Embodiments of the invention which include the mechanical bias and the locking system will be described in more detail below.

Figure 3:
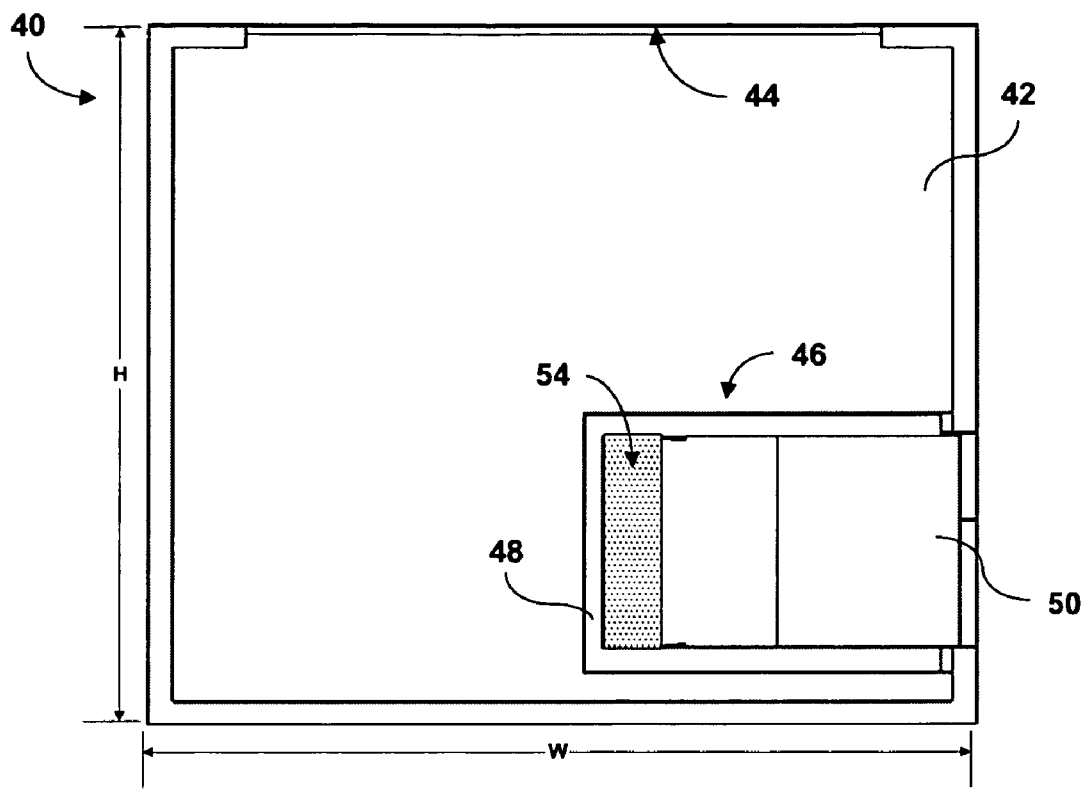
FIGS. 3 and 4 are conceptual top views illustrating an exemplary embodiment of a memory card, which is substantially similar to the memory card from FIGS. 1 and 2.
Figure 4:
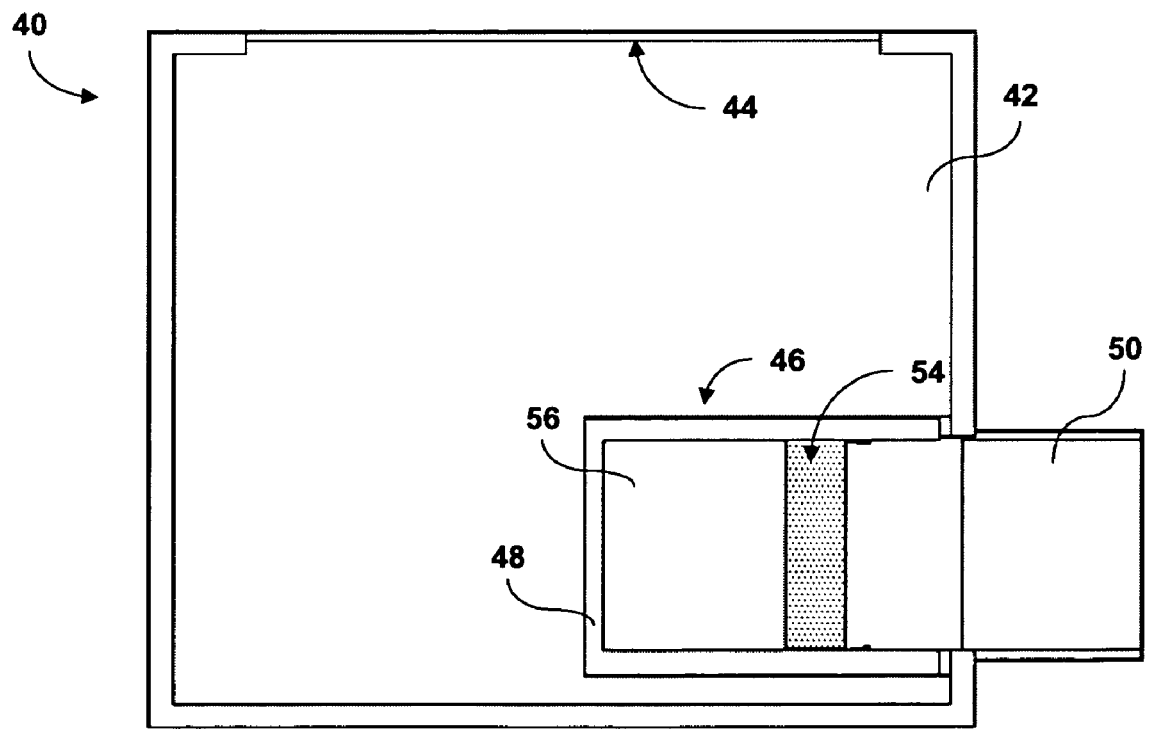

FIGS. 3 and 4 are conceptual top views illustrating an exemplary embodiment of a memory card 40, which is substantially similar to memory card 10 from FIGS. 1 and 2. Memory card 40 includes a memory card housing 42 that defines a host connector housing 48 and conforms to a form factor of the memory card standard with a height (H) and a width (W). The memory card standard may be a CompactFlash standard, which includes a form factor with a height of approximately 36 mm and a width of approximately 42 mm. Additionally, memory card 40 includes a device connector 44 and a host connector 46 held within host connector housing 48. Host connector 46 comprises a shieldless tab 50 extendable from host connector housing 48, a textured region 54 disposed on shieldless tab 50, and a host connector housing cover 56 adjacent shieldless tab 50.

With shieldless tab 50 retracted into host connector housing 48, as shown in FIG. 3, memory card 40 may operate substantially similar to a conventional memory card of the same standard. In other words, memory card 40 is able to couple, via device connector 44 conforming to the memory card standard, to any device compatible with the memory card standard without affecting the size and operation of the device. For example, memory card 40 may fit into a compatible memory card receptacle in conventional voice recorders, digital video camcorders, digital cameras, personal digital assistants (PDAs), cellular phones, video games, digital televisions, photo printers, and the like.

Host connector 46 conforms to a host connection standard and, with shieldless tab 50 extended from host connector housing 48 as shown in FIG. 4, allows direct coupling of memory card 40 to a host computer interface compatible with the host connection standard. Accordingly, memory card 40 substantially eliminates the need for a memory card adapter or reader to retrieve data stored in a memory within memory card housing 42. Shieldless tab 50 may comprise an altered version of a conventional connector interface conforming to the host connection standard in order to fit within memory card housing 42 without affecting the form factor of the memory card standard. Regardless, shieldless tab 50 maintains compatibility with the host connection standard. The elimination of the shield greatly reduces a thickness of the host connector, which allows shieldless tab 50 to fit within memory card housing 42. Furthermore, the invention reduces the benefits that would otherwise be provided by an electrical shield because shieldless tab 50 directly couples to the memory within memory card housing 42 and to a host computer interface without a cable. Conventionally, the electrical shield is used to reduce electrostatic effects that may corrupt the data signal carried by the cable. For this reason, eliminating the cable makes the electrical shield less important.

Shieldless tab 50 is electrically coupled to the memory within memory card housing 42 via electrical contacts disposed on shieldless tab 50 and within host connector housing 48. When inserted into a compatible host computer interface, shieldless tab 50 electrically couples the computing device to the memory.

As shown in FIGS. 3 and 4, host connector housing 48 provides access to host connector 46 including textured region 54 disposed on shieldless tab 50 to allow host connector 46 to be slid within host connector housing 48 to retract and extend shieldless tab 50 by pushing on textured region 54. For example, a user may push on textured region 54 to slide host connector 46 forward to extend shieldless tab 50 from host connector housing 48. Once shieldless tab 50 is extended from host connector housing 48, host connector housing cover 56 protects any components disposed within host connector housing 48 from exposure to electrostatic effects, dust, and debris. In the embodiment including a mechanical bias and a locking system, the user may need to press down on textured region 54 to disengage the locking system and slide host connector 46 within host connector housing 48. In other embodiments, host connector 46 does not necessarily include a textured region or a host connector housing cover.

Figure 5:
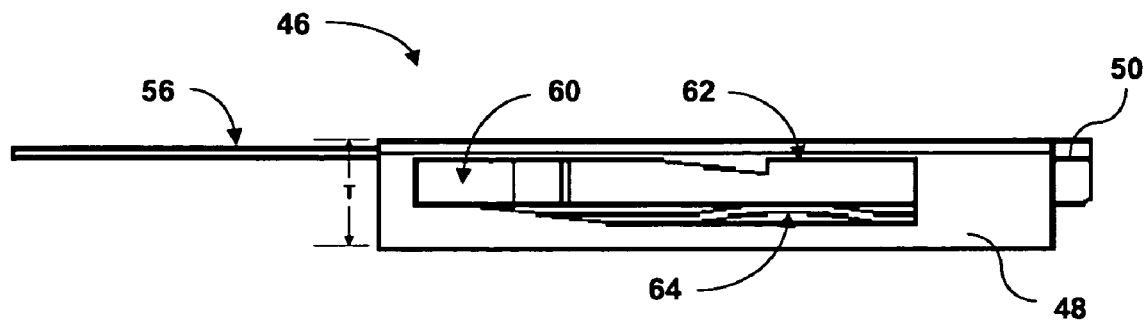
FIGS. 5 and 6 are conceptual side views illustrating an exemplary embodiment of a host connector held in a host connector housing.
Figure 6:
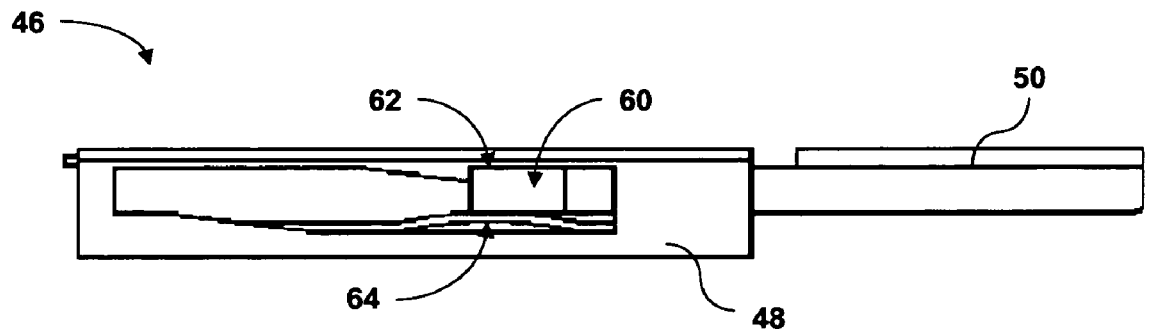

FIGS. 5 and 6 are conceptual side views illustrating an exemplary embodiment of host connector 46 held in host connector housing 48. Again, host connector 46 comprises shieldless tab 50 and host connector housing cover 56 adjacent to shieldless tab 50. Additionally host connector 46 includes a locking element 60. Host connector housing 48 includes a locking slot 62 and electrical contacts 64. Host connector housing 48 comprises a thickness (T), which is substantially equal to a thickness of memory card housing 42 of memory card 40 conforming to the memory card standard form factor.

The memory card standard may be a CompactFlash type I standard, which includes a form factor with a thickness of approximately 3.3 mm. The memory card standard may also be a CompactFlash type II standard, which includes a form factor with a thickness of approximately 5 mm. A thickness of shieldless tab 50 is less than the thickness (T) of host connector housing 48 and memory card housing 42. For example, a USB compatible tab comprises a thickness of approximately 2.0 mm. Furthermore, a conventional USB plug including an electrical shield comprises a thickness of approximately 4.5 mm, which is larger than the CompactFlash type I standard form factor. For this reason, the invention contemplates the elimination of the conventional USB shield so that the host connector comprising a shieldless tab defines a thickness less than that of the memory card.

Host connector 46 may also include electrical contacts disposed on shieldless tab 50 that couple to electrical contacts 64 within host connector housing 48. In that way, shieldless tab 50 may be electrically coupled to a memory within memory card housing 42. In the embodiment shown in FIGS. 5 and 6, electric contacts 64 run along the entire length of host connector housing 48 such that the electrical contacts may be continually coupled to each other regardless of the position of shieldless tab 50. In another embodiment, electrical contacts 64 may be placed within host connector housing 48 such that the electrical contacts couple to each other only when shieldless tab 50 is extended from host connector housing 48.

As shown in FIGS. 5 and 6, electrical contacts 64 are spring loaded by a curvature in the contacts to provide a mechanical bias to host connector 46. When shieldless tab 50 is retracted into host connector housing 48, as shown in FIG. 5, electrical contacts 64 bias shieldless tab 50 against host connector housing 48 such that shieldless tab 50 is held in a retracted position and a user must depress shieldless tab 50 against electrical contacts 64 to extend shieldless tab 50. For example, a user may press down on textured region 54, from FIGS. 3 and 4, to remove shieldless tab 50 from the pressure of the mechanical bias. The user may then push forward on textured region 54 to slide host connector 46 within host connector housing 48 to extend shieldless tab 50 from host connector housing 48.

When shieldless tab 50 is extended from host connector housing 48, as shown in FIG. 6, locking element 60 of host connector 46 engages with locking slot 62 formed in host connector housing 48 to lock shieldless tab 50 in an extended position. In other embodiments, host connector housing 48 may include another locking slot to lock shieldless tab 50 in a retracted position. The mechanical bias applied to host connector 46 forces locking element 60 against host connector housing 48 such that once shieldless tab 50 is fully extended from host connector housing 48, locking element 60 will automatically engage with locking slot 62. In particular, by locking shieldless tab 50 into the extended position, shieldless tab 50 can be ensured to withstand the force required for insertion into a host computer interface without being accidentally retracted. Locking element 60 may also restrain host connector 46 from completely disengaging from host connector housing 48. In order to retract shieldless tab 50 into host connector housing 48, a user again must depress shieldless tab 50 against electrical contacts 64 to disengage locking element 60 from locking slot 62 and slide host connector 46 within host connector housing 48.

Figure 7:
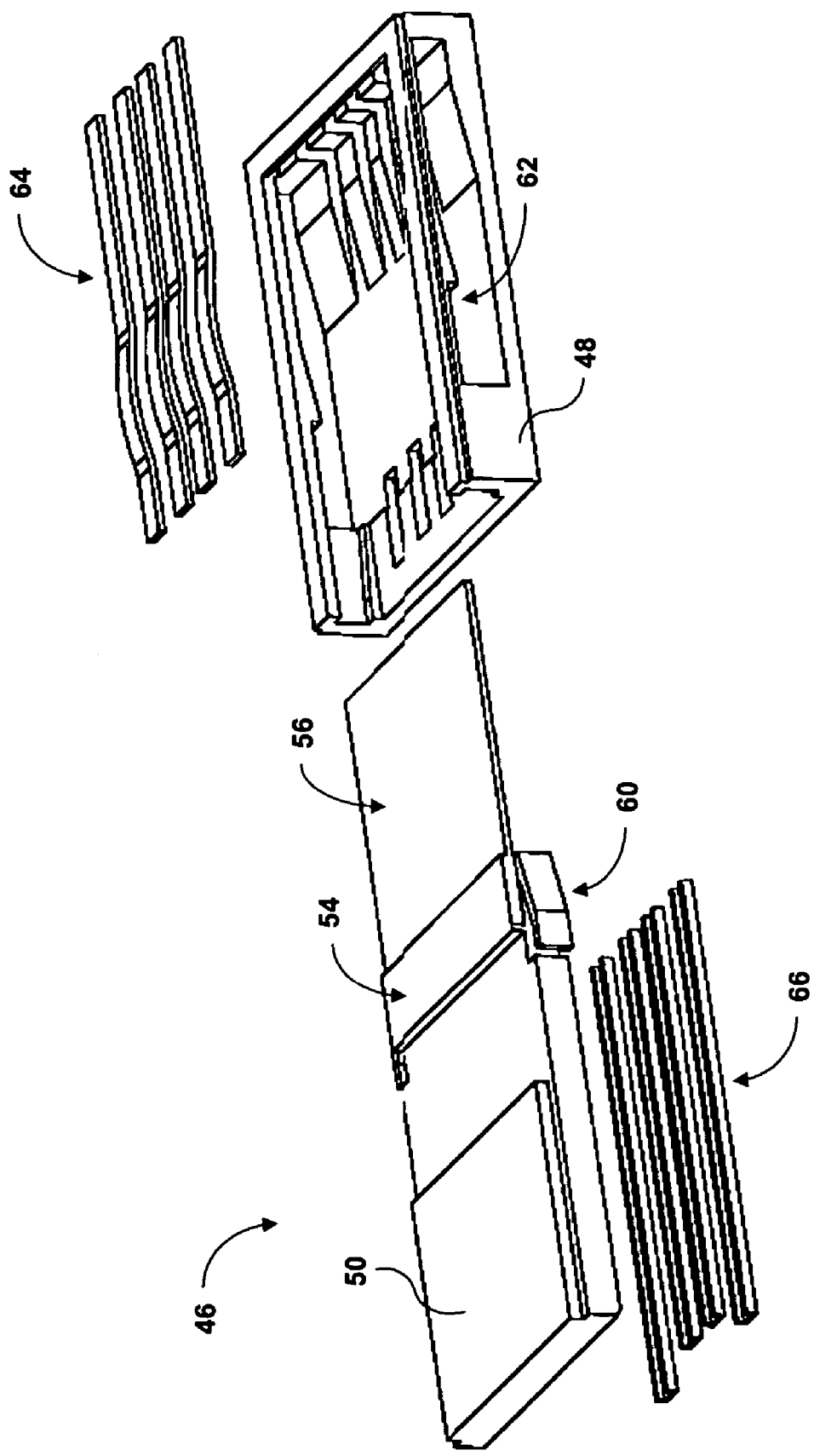
FIG. 7 is a conceptual exploded view illustrating a host connector and a host connector housing.

FIG. 7 is a conceptual exploded view illustrating host connector 46 and host connector housing 48. Host connector 46 includes shieldless tab 50, textured region 54 disposed on shieldless tab 50, host connector housing cover 56 adjacent shieldless tab 50, and locking element 60. In addition, host connector 46 comprises electrical contacts 66 disposed on shieldless tab 50. Host connector housing 48 includes locking slot 62 and electrical contacts 64.

When host connector 46 is inserted into host connector housing 48, electrical contacts 66 will continually couple to electrical contacts 64, disposed within host connector housing 48, regardless of the position of shieldless tab 50 by sliding along electrical contacts 64 as host connector 46 slides within host connector housing 48. Electrical contacts 64 and 66 electrically couple shieldless tab 50 to a memory within memory card housing 42.

Locking element 60 includes a contour that ensures host connector 46 cannot fully disengage from host connector housing 48 once inserted. The contoured locking element 60 cannot be pushed out of locking slot 62 without disassembling host connector housing 48. Eliminating the possibility of removing host connector 46 from host connector housing 48, ensures electrical contacts 64 and 66 remain accurately coupled to each other to maintain a quality connection between shieldless tab 50 and the memory within memory card 40.

Electrical contacts 64 include a curvature that spring loads the electrical contacts 64 to create the mechanical bias that controls the movement of host connector 46 when inserted into host connector housing 48. The curvature is placed along electrical contacts 64 such that the bias against host connector 46 forces locking element 60 into locking slot 62. In an embodiment including a second locking slot formed in host connector housing 48 to lock shieldless tab 50 in a retracted position, a different curvature may be defined to ensure engagement of both locking elements into the respective locking slots.

Figure 8:
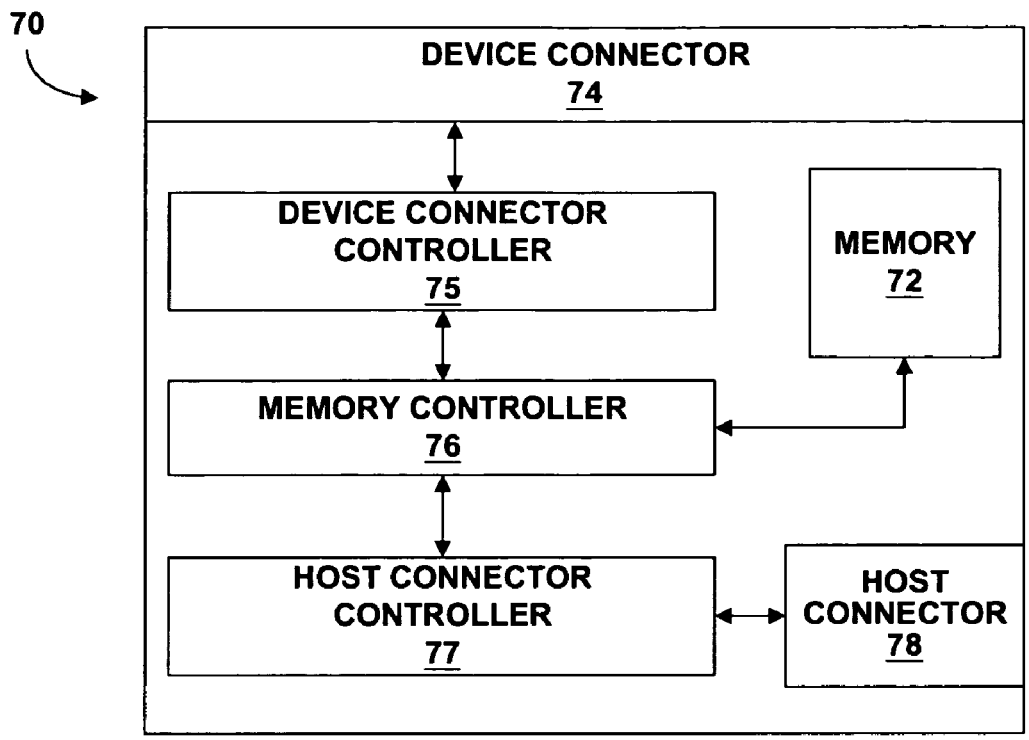
FIG. 8 is a block diagram illustrating an exemplary architecture of a removable memory card according to an embodiment of the invention.

FIG. 8 is a block diagram illustrating an exemplary architecture of a removable memory card 70, which may correspond to any of memory cards 10 or 40. Memory card 70 includes a memory 72, a device connector 74, a device connector controller 75, a memory controller 76, a host connector controller 77, and a host connector 78. Device connector 74 conforms to the memory card standard and allows access to memory 72 by a device compatible with the memory card standard. Host connector 78 conforms to a host connection standard and allows access to memory 72 upon insertion into a host computer interface compatible with the host connection standard.

Device connector 74 may be electrically coupled to memory 72 via device connector controller 75 and memory controller 76. Host connector 78 may be electrically coupled to memory 72 via host connector controller 77 and memory controller 76. By way of example, memory 72 may comprise one or more elements of flash memory, electrically-erasable-programmable-read-only-memory (EEPROM), non-volatile random-access-memory (NVRAM), and other nonvolatile or volatile memory types, such as synchronous dynamic random-access-memory (SDRAM), or the like. Memory 72 may include a plurality of such memory elements in order to support large memory capacity.

Power is applied to memory card 70 when it is connected via the memory card standard to a portable device or via the host connection standard to a computing device. The application of power allows the portable device or computing device to determine which electrical contact elements are active. Accordingly, the portable device or computing device can determine which connector 74, 78 is being used based on which electrical contact elements are active.

Device connector controller 75 or host connector controller 77 is enabled to facilitate access to memory 72, depending on which connector 74, 78 is being used. Communication between the portable device or computing device and memory controller 76 may then be sent through the powered connector and the enabled controller. The portable device or computing device may read or modify data that is stored in memory 72 as well as store new data or erase existing data. Memory controller 76 manipulates the data stored in memory 72 according to operations specified by the portable device or computing device.

Device connector 74 may couple to a portable device interface conforming to the same memory card standard and operate in a similar manner to a conventional memory card of the memory card standard. Host connector 78 may couple directly to a host computer interface conforming to the same host connection standard and enable communication between the computing device and memory controller 76. The invention eliminates the need for an adapter or reader to couple memory card 70 to the computing device by including an adapter's function in the memory card.

Figure 9:
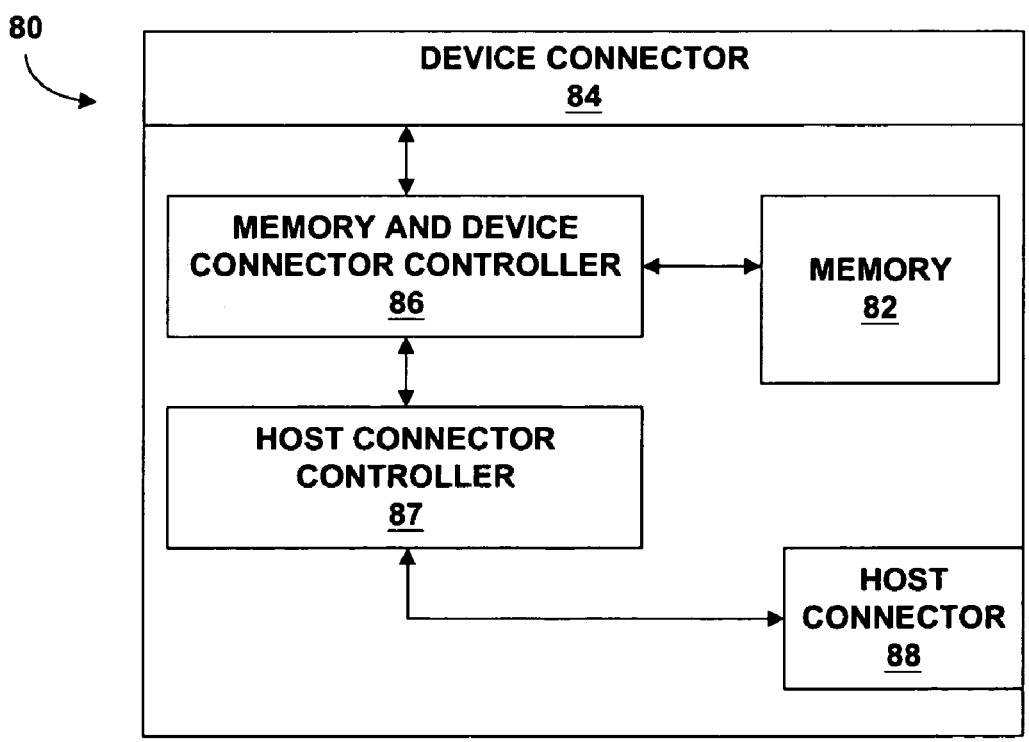
FIG. 9 is a block diagram illustrating an exemplary architecture of a removable memory card.

FIG. 9 is a block diagram illustrating another exemplary architecture of a removable memory card 80, which may correspond to any of memory cards 10 or 40. Memory card 80 includes a memory 82, a device connector 84, a memory and device connector controller 86, a host connector controller 87, and a host connector 88. Memory 82, device connector 84, and host connector 88 may operate substantially similar to memory 72, device connector 74 and host connector 78, respectively, from FIG. 8.

Whereas the architecture shown in FIG. 8 utilizes three separate controllers, i.e., one for each connector 74, 78 and one for the memory 72, the embodiment of FIG. 9 integrates the memory controller with the controller for device connector 84 as a common memory and device connector controller 86. Such an integrated controller 86 may consume less space and power than separate controllers. Moreover, controllers that integrate the memory and device connector controls are commercially available for use in conventional memory cards that include a memory and a single connector.

Controller 86 controls memory 82 and output via device connector 84. The host connector controller 87 controls memory 82 and output via host connector 88. Device connector 84 may be electrically coupled directly to controller 86 and then to memory 82, while host connector 88 may be electrically coupled to memory 82 via host connector controller 87.

In one embodiment of the invention, memory card 80 includes device connector 84 conforming to a Compact Flash standard and host connector 88 conforming to an USB standard. Memory card 80 also includes controller 86 conforming to a flash memory controller, memory 82 conforming to a flash memory, and host connector controller 87 conforming to a USB controller. These components are readily available due to their wide usage in traditional removable memory cards and adapters or readers. Flash memory controllers are manufactured by SanDisk™ Corporation and Lexar Media Inc., among others. Flash memory is produced by many companies including Intel, Samsung, and Toshiba. USB controllers are typically found in flash memory card adaptors or readers and other devices utilizing USB connectivity. Such controllers are available from Cypress Semiconductor Corporation, Philips Semiconductors, and many other semiconductor companies. In this embodiment, substantially all the elements included in memory card 80 are already being produced for other purposes and may be purchased directly from the manufacturer.

Figure 10:
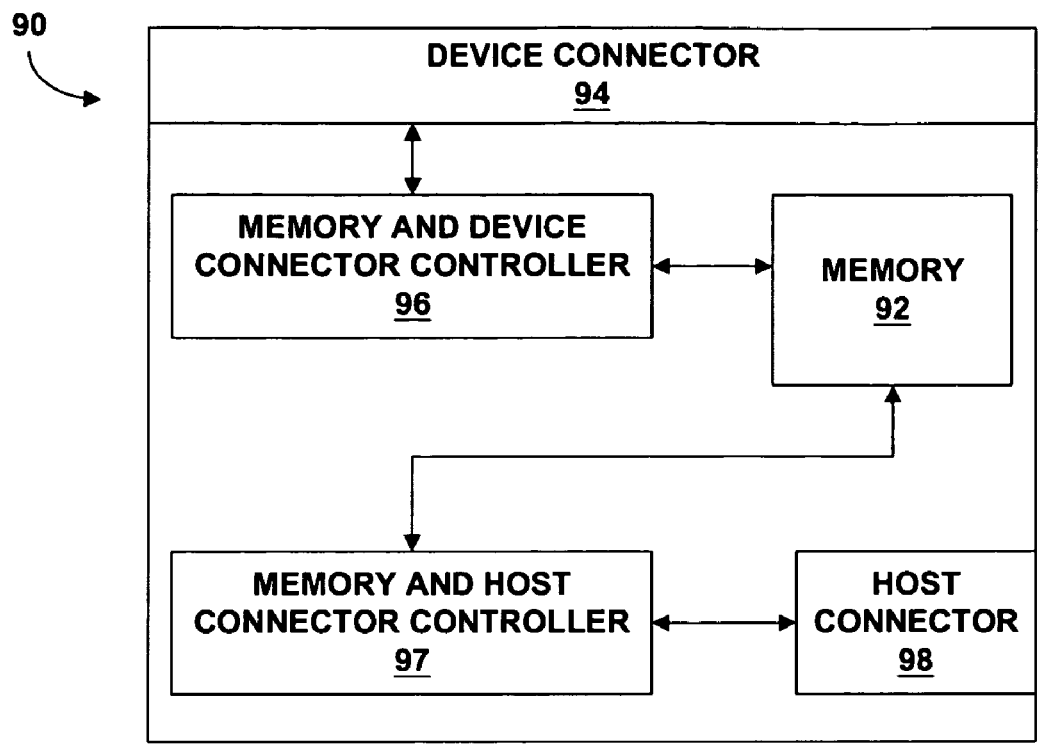
FIG. 10 is a block diagram illustrating an exemplary architecture of a removable memory card.

FIG. 10 is a block diagram illustrating another exemplary architecture of a removable memory card 90, which may correspond to any of memory cards 10 or 40. Memory card 90 includes a memory 92, a device connector 94, a memory and device connector controller 96, a memory and host connector controller 97, and a host connector 98. Memory 92, device connector 94, and host connector 98 may operate substantially similar to memory 72, device connector 74 and host connector 78, respectively, from FIG. 8.

Whereas the architecture shown in FIG. 8 utilizes three separate controllers, i.e., one for each connector 74, 78 and one for the memory 72, the embodiment of FIG. 10, integrates memory control into the controller for device connector 94 as a common memory and device connector controller 96, substantially similar to memory and device connector controller 86 from FIG. 9. Memory control is also integrated into the controller for host connector 98 as a common memory and host connector controller 97. Such integrated controllers 96, 97 may consume less space and power than three separate controllers. Moreover, controllers that integrate the memory and device connector controls are commercially available for use in conventional memory cards that include a memory and a single device connector. Additionally, controllers that integrate the memory and host connector controls are also commercially available for use in conventional portable memory drives that include a memory and a single host connector.

Memory and device controller 96 controls memory 92 and output via device connector 94. Memory and host controller 97 also controls memory 92 and output via host connector 98. Device connector 94 may be electrically coupled to memory 92 via memory and device controller 96. Host connector 98 may be electrically coupled to memory 92 via memory and host controller 97.

In one embodiment of the invention, memory card 90 includes device connector 94 conforming to a CompactFlash standard and host connector 98 conforming to an USB standard. Memory card 90 also includes memory and device controller 96 conforming to a flash memory card controller, memory 92 conforming to a flash memory, and memory and host controller 97 conforming to a flash memory drive controller. These components are readily available due to their wide usage in traditional removable memory cards and traditional removable memory drives. In this embodiment, all the elements included in memory card 90 are already being produced for other purposes and may be purchased directly from the manufacturer.

Figure 11:
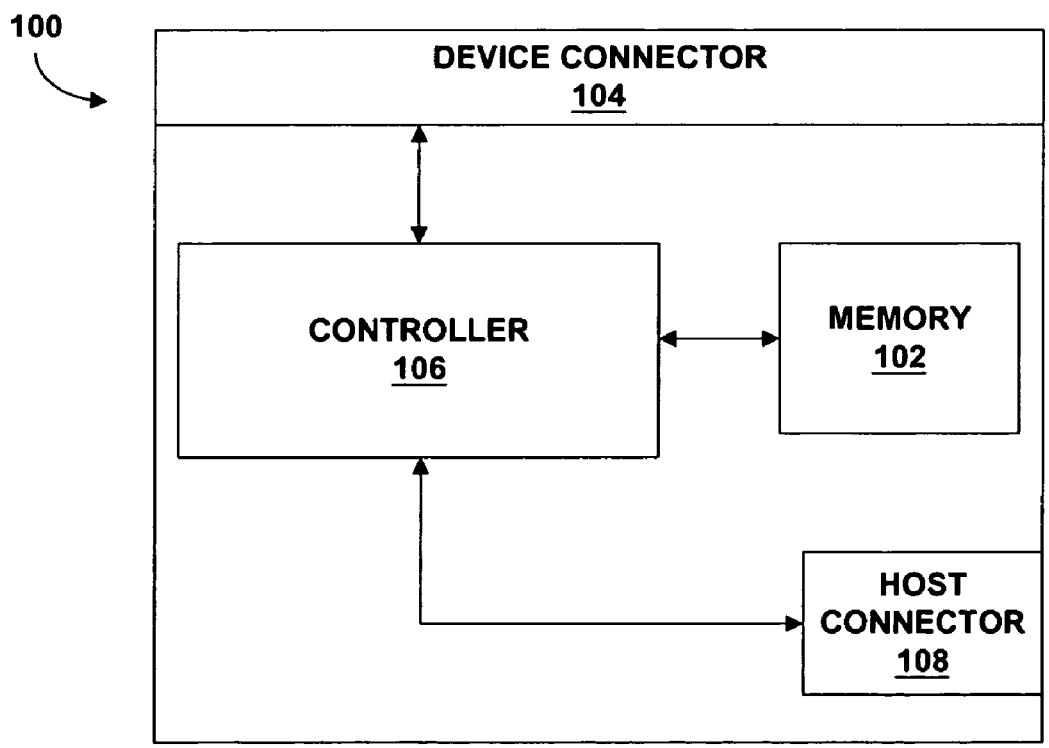
FIG. 11 is a block diagram illustrating an exemplary architecture of a removable memory card.

FIG. 11 is a block diagram illustrating another exemplary architecture of a removable memory card 100, which may correspond to any of memory cards 10 or 40. In this embodiment, memory card 100 includes a memory 102, a device connector 104, a controller 106, and a host connector 108. Memory 102, device connector 104, and host connector 108 may operate substantially similar to memory 72, device connector 74 and host connector 78, respectively, from FIG. 8.

Controller 106 comprises a memory controller integrated with a device connector controller and a host connector controller. Whereas the architecture shown in FIG. 8 utilizes a separate controller for each connector 74, 78 and the memory 72, controller 106 integrates such functionality of three different controllers into a common unit. By integrating the functionality of each separate controller into controller 106, less space and power may be consumed on memory card 100. Controller 106 controls the memory 102 and output via device connector 104 and host connector 108. Device connector 104 may be electrically coupled directly to controller 106 and then to memory 102. Host connector 108 may also be electrically coupled to memory 102 via controller 106.

In one embodiment, memory card 100 includes device connector 104 conforming to a CompactFlash standard and host connector 108 conforming to an USB standard. Memory card 100 also includes controller 106 conforming to a flash memory controller with USB control and memory 102 conforming to a flash memory. Device connector 104 may couple to a portable device contact conforming to the CompactFlash standard. Host connector 108 may couple directly to a computing device's USB port allowing communication between the computing device and controller 106 without an adaptor or reader. The flash memory controller with USB control may be developed as an application specific integrated circuit (ASIC) integrating the functionality of a conventional flash memory controller and a USB controller.

Various embodiments of the invention have been described. For example, a memory card has been described that includes both a device connector and a host connector. The memory card operates as a conventional memory card when a shieldless tab of the host connector is retracted into the memory card and eliminates the need for an adapter or reader when the shieldless tab is extended from the memory card. Further the shieldless tab is altered from a conventional connection interface to fit within a form factor of the memory card standard. A mechanical bias and a locking system have also been described that control movement of the host connector and positioning of the shieldless tab.

Nevertheless, various modifications may be made without departing from the scope of the invention. For example, a variety of locking systems may be applied to the invention as long as the shieldless tab is able to withstand the force required for insertion to a host computer interface. The locking systems may include movable parts or a plurality of locking positions. Moreover, the mechanical bias may be provided to the host connector by a means other than spring loaded electrical contacts or no mechanical bias may be provided. Finally, the memory card may conform to a variety of memory card standards and host connection standards such that a form factor different from the embodiments described herein may be used. In particular, the shieldless tab may comprise a variety of forms as long as compatibility with the host connection standard conformed to by the host connector is maintained. These and other embodiments are within the scope of the following claims.

The invention claimed is:

1. A memory card comprising:
a memory card housing;
a host connector housing formed in the memory card housing;
a memory in the memory card housing;
a device connector accessible through the memory card housing, the device connector conforming to a memory card standard and allowing access to the memory by a device compatible with the memory card standard; and
a host connector comprising a shieldless tab extendable from the host connector housing, the host connector conforming to a host connection standard and allowing access to the memory upon insertion of the shieldless tab extended from the host connector housing into a host computer interface compatible with the host connection standard.

2. The memory card of claim 1, wherein the host connector conforms to one of a Universal Serial Bus (USB) standard and a Universal Serial Bus 2 (USB2) standard, and wherein the shieldless tab comprises a USB compatible tab without an electrical shield.

3. The memory card of claim 1, wherein the device connector conforms to a memory card standard selected from a group consisting of: a CompactFlash standard, a Smart Media standard, a MultiMedia Card standard, a Secure Digital standard, a Memory Stick standard, and an xD standard.

4. The memory card of claim 1, wherein the host connector comprises first electrical contacts disposed on the shieldless tab and coupled to second electrical contacts disposed within the host connector housing regardless of whether the shieldless tab is extended from the host connector housing or retracted into the host connector housing.

5. The memory card of claim 1, wherein the host connector slides within the host connector housing to extend the shieldless tab from the host connector housing for insertion of the shieldless tab into a host computer interface and to refract the shieldless tab into the host connector housing such that the memory card can be inserted into a device compatible with the memory card standard.

6. The memory card of claim 5, wherein the host connector housing provides access to a textured region disposed on the shieldless tab, the textured region providing traction such that pushing on the textured region causes the host connector to slide within the host connector housing.

7. The memory card of claim 1, wherein the device connector is disposed on a first side of the memory card housing and the host connector is disposed on a second side of the memory card housing adjacent to the first side.

8. The memory card of claim 1, wherein the host connector comprises a locking element that engages with a locking slot formed in the host connector housing to lock the shieldless tab in an extend position.

9. The memory card of claim 8, wherein the locking slot is a first locking slot and wherein the locking element engages with a second locking slot formed in the host connector housing to lock the shieldless tab in a retracted position.

10. The memory card of claim 8, wherein the locking element prevents the host connector from completely disengaging from the host connector housing.

11. The memory card of claim 8, further comprising spring loaded electrical contacts disposed within the host connector housing that provide a mechanical bias to the host connecter such that the host connector is depressed against the electrical contacts and slid within the host connector housing to extend the shieldless tab from the host connector housing and refract the shieldless tab into the host connector housing and the locking element is biased against the host connector housing to ensure engagement with the locking slot when the shieldless tab is extended.

12. The memory card of claim 1, further comprising spring loaded electrical contacts disposed within the host connector housing that provide a mechanical bias to the host connector such that the host connector is depressed against the mechanical bias and slid within the host connector housing to extend the shieldless tab from the host connector housing and refract the shieldless tab into the host connector housing.

13. A memory card comprising:
- a memory card housing having dimensions which substantially conform to a form factor of a memory card standard including a height of approximately 36 mm and a width of approximately 42 mm;
- a host connector housing formed in the memory card housing;
- a memory in the memory card housing;
- a device connector accessible through the memory card housing, the device connector conforming to the memory card standard and allowing access to the memory by a device compatible with the memory card standard; and
- a host connector comprising a shieldless tab extendable from the host connector housing, the host connector conforming to a host connection standard and allowing access to the memory upon insertion of the shieldless tab extended from the host connector housing into a host computer interface compatible with the host connection standard.

14. The memory card of claim 13, wherein the device connector conforms to a CompactFlash type I memory card standard and wherein the memory card housing conforms to the CompactFlash type I memory card form factor including a thickness of approximately 3.3 mm.

15. The memory card of claim 13, wherein the device connector conforms to a CompactFlash type II memory card standard and wherein the memory card housing conforms to the CompactFlash type II memory card form factor including a thickness of approximately 5 mm.

16. The memory card of claim 13, wherein the memory card standard form factor includes a thickness, which is less than a thickness of the shieldless tab including an electrical shield.

17. A memory card comprising:
- a memory card housing;
- a host connector housing formed in the memory card housing;
- a memory in the memory card housing;
- a device connector accessible through a first side of the memory card housing, the device connector conforming to a memory card standard and allowing access to the memory by a device compatible with the memory card standard;
- a host connector disposed on a second side of the memory card housing adjacent the first side and comprising a shieldless tab extendable from the host connector housing, first electrical contacts disposed on the shieldless tab, and a locking element, the host connector conforming to a host connection standard and allowing access to the memory upon insertion of the shieldless tab extended from the host connector housing into a host computer interface compatible with the host connection standard;
- second electrical contacts disposed within the host connector housing and coupled to the first electrical contacts disposed on the shieldless tab regardless of whether the shieldless tab is extended from the host connector housing or retracted into the host connector housing, wherein the second electrical contacts are spring loaded to provide a mechanical bias to the host connector such din the host connector is depressed against the second electrical contacts in order to slide the host connector within the host connector housing to extend the shieldless tab from the host connector housing and retract the shieldless tab into the host connector housing; and
- a locking slot formed in the host connector housing, wherein the second electrical contacts bias the locking element of the host connector against the host connector housing such that the locking element engages with the locking slot when the shieldless tab is extended from the host connector housing to Jock the shieldless tab in an extended position.

18. The memory card of claim 17, wherein the locking slot is a first locking slot, the memory card further comprising a second locking slot formed in the host connector housing, wherein the locking element engages with the second locking slot when the shieldless tab is retracted into the host connector housing to lock the shieldless tab in a retracted position.

19. The memory card of claim 17, wherein the host connector conforms to one of a Universal Serial Bus (USB) standard and a Universal Serial Bus 2 (USB2) standard, and wherein the shieldless tab comprises a USB compatible tab without an electrical shield.

20. The memory card of claim 17, wherein the device connector conforms to a memory card standard selected from a group consisting of: a CompactFlash standard, a Smart Media standard, a MultiMedia Card standard, a Secure Digital standard, a Memory Stick standard, and an xD standard.

* * * * *

UNITED STATES PATENT AND TRADEMARK OFFICE
CERTIFICATE OF CORRECTION

PATENT NO. : 7,151,673 B2
APPLICATION NO. : 10/788594
DATED : December 19, 2006
INVENTOR(S) : Trung V. Le et al.

It is certified that error appears in the above-identified patent and that said Letters Patent is hereby corrected as shown below:

Title page
    Item (73), "Imation corp." should read --Imation Corp.--

Column 12
    Line 44, "refract" should read --retract--.

Column 13
    Line 7, "refract" should read --retract--.
    Line 17, "refract" should read --retract--.

Column 14
    Line 24, "din" should read --that--.
    Line 35, "Jock" should read --lock--.

Signed and Sealed this

Eighth Day of May, 2007

JON W. DUDAS
*Director of the United States Patent and Trademark Office*